US008316356B2

(12) United States Patent
Frey

(10) Patent No.: US 8,316,356 B2
(45) Date of Patent: Nov. 20, 2012

(54) METHOD FOR OPERATING AND MONITORING A CONTROL DEVICE, CORRESPONDING OPERATING/MONITORING DEVICE, CONTROL DEVICE AND MACHINE WITH SUCH A CONTROL DEVICE, AND USES OF THE METHOD TOGETHER WITH DATA STORAGE MEDIA

(75) Inventor: Bernhard Frey, München (DE)

(73) Assignee: Siemens Aktiengesellschaft, München (DE)

( * ) Notice: Subject to any disclaimer, the term of this patent is extended or adjusted under 35 U.S.C. 154(b) by 959 days.

(21) Appl. No.: 11/988,952

(22) PCT Filed: Jul. 6, 2006

(86) PCT No.: PCT/EP2006/063971
§ 371 (c)(1),
(2), (4) Date: Feb. 6, 2009

(87) PCT Pub. No.: WO2007/009890
PCT Pub. Date: Jan. 25, 2007

(65) Prior Publication Data
US 2009/0182437 A1    Jul. 16, 2009

(30) Foreign Application Priority Data

Jul. 21, 2005 (DE) .......................... 10 2005 034 168

(51) Int. Cl.
*G05B 19/00* (2006.01)
*G06F 3/048* (2006.01)
*G06F 3/041* (2006.01)
*G06F 9/45* (2006.01)

(52) U.S. Cl. .......... 717/139; 715/772; 715/702; 700/83; 700/2

(58) Field of Classification Search .................. 717/139; 715/772, 702; 700/2, 83
See application file for complete search history.

(56) References Cited

U.S. PATENT DOCUMENTS 5,867,175 A * 2/1999 Katzenberger et al. ....... 345/473
(Continued)

FOREIGN PATENT DOCUMENTS

DE        199 29 933 A1       1/2001
(Continued)

OTHER PUBLICATIONS

Cuber Ulrich, "Linux Scripting"; 2001, Hrsg. Haseller/Fahnenstich, Franszi's-Verlag, pp. 4-15; 335; 346-349;393-409 and 419-423.

*Primary Examiner* — Chat Do
*Assistant Examiner* — Lynda Dinh

(57) ABSTRACT

There is described a method, wherein an interpreter program is executed on a control device and is adapted to access scripts having display components and program architectures. Said program architectures are enabled to access operating data of the firmware of the control device, said operational data being convertible to display data of a defined display format and vice versa. The scripts are run, the program architectures compiling the corresponding result in the form of display components with optionally the display data in the defined display format and making the result available to the operating/monitoring device. A display program is executed on the reporting/monitoring device in order to display at least the display components in the defined display format. References to at least one script on the control device are deposited in the display components. These references are connected to an event, and the interpreter program initiates and runs the corresponding script when this event occurs. The operating/monitoring device can no longer directly access the sensitive firmware of the control device. Communication is carried out via an interpreter program. Access to the actual control application is no longer possible.

15 Claims, 9 Drawing Sheets

U.S. PATENT DOCUMENTS

| | | |
|---|---|---|
| 6,854,026 B1 | 2/2005 | Sexton et al. |
| 2002/0055947 A1* | 5/2002 | Schultz et al. ............... 707/500 |
| 2004/0122908 A1* | 6/2004 | Konopka et al. ............. 709/208 |
| 2005/0257195 A1* | 11/2005 | Morrow et al. ............... 717/109 |
| 2006/0036941 A1* | 2/2006 | Neil ............................. 715/526 |
| 2006/0259259 A1* | 11/2006 | Rozenboim et al. ............ 702/83 |
| 2010/0063614 A1* | 3/2010 | Rosenboim et al. .......... 700/121 |

FOREIGN PATENT DOCUMENTS

| | | |
|---|---|---|
| DE | 100 65 401 A1 | 3/2003 |
| DE | 101 51 117 A1 | 5/2003 |
| DE | 102 29 878 A1 | 11/2003 |
| EP | 0 973 297 A2 | 1/2000 |
| EP | 1 316 865 A1 | 6/2003 |
| EP | 1 548 527 A1 | 6/2005 |
| JP | 2004-505373 A | 2/2004 |
| JP | 2004-297234 A | 10/2004 |
| WO | WO 00/39645 A1 | 7/2000 |
| WO | WO 2005-003980 A1 | 1/2005 |

* cited by examiner

FIG 4

```
<!---------- MATH ------------>
<macro name="ADD">          <!-- Addition -->
    <arg></arg>             <!-- 1st summand: Integer, Float, String -->
    <arg></arg>             <!-- 2nd summand: Integer, Float, String -->
    [<arg></arg>...]        <!-- nth summand: Integer, Float, String -->
</macro>                    <!-- return: Integer, Float, String -->
```
↖ 331

FIG 5

```
<!-----------IF-------------->
<macro name="IF">           <!-- IF instruction -->
    <arg></arg>             <!-- Operand A: Integer, Float, String -->
    <arg></arg>             <!-- Operator GRTH, LWTH, EQU, DIF -->
    <arg></arg>             <!-- Operand B: Integer, Float, String -->
    <do>                        <-- THEN Block: Compound -->
    </do>
[<arg>ELSE</arg>
    <do>                        <!-- ELSE Block (optional): Compound -->
    </do>]
</macro>                    <!-- return Nullstring or Compound -->
```
↖ 332

FIG 6

```xml
<!-- LOAD_PAGE Script (started by the link element) -->
<function name="LOAD_PAGE">
    <argument>PATH_REL</argument>
    <do>
        <macro name="GLOBAL">
            <arg>PATH_ABS</arg>
        </macro>
        <macro name="SETVAR">
            <arg>PATH_ABS</arg>
            <arg>
                <macro name="BUILT_PATH">
                    <arg>
                        <var>PATH_ABS</var>
                    </arg>
                    <arg>
                        <var>PATH_REL</var>
                    </arg>
                </macro>
            </arg>
        </macro>
        <macro name="PARSE_PAGE">
            <arg>
                <var>PATH_ABS</var>
            </arg>
        </macro>
    </do>
</function>
```

```
<!-- LOAD_PARAMETER Script (started by the edit element) -->
<function name="LOAD_PARAMETER">
    <argument>DO</argument>
    <argument>PAR</argument>
    <argument>IDX</argument>
    <do>
        <macro name="TOSTRING">
            <arg>
                <macro name="GETPARAM">
                    <arg><var>DO</var></arg>
                    <arg><var>PAR</var></arg>
                    <arg><var>IDX</var></arg>
                </macro>
            </arg>
        </macro>
    </do>
</function>
```
⟵ 312

```
<!---------- PARAM ---------->
<macro name="GETPARAM">            <!-- Read drive parameter -->
    <arg></arg>                    <!-- DO number: Integer -->
    <arg></arg>                    <!-- Parameter number: Integer -->
    <arg></arg>                    <!-- Index: Integer -->
</macro>                           <!-- return: Integer, Float -->

<macro name="SETPARAM">            <!-- Write drive parameter -->
    <arg></arg>                    <!-- DO number: Integer -->
    <arg></arg>                    <!-- Parameter number: Integer -->
    <arg></arg>                    <!-- Index: Integer -->
    <arg></arg>                    <!-- Value: Integer, Float -->
</macro>                           <!-- return: Nullstring -->
```

FIG 9
```
<!--P(99)=P(98)-->
<macro name="SETPARAM">
    <arg>1</arg>
    <arg>99</arg>
    <arg>0</arg>
    <arg>
        <macro name="GETPARAM">
            <arg>1</arg>
            <arg>98</arg>
            <arg>0</arg>
        </macro>
    </arg>
</macro>
```
← 334

FIG 10  Actual rotational speed

Main menu ~291

FIG 11
```
<text>Actual rotational speed<br/></text>

<link [size="16"]>
    <href>SINAMICS_G\MAIN.AXF</href>
    <label>Main menu</label>
</link>
```
← 294

FIG 12
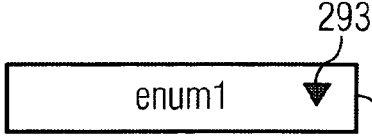
293
enum1 ▼  ~292

FIG 13
```
<combobox update="yes" [delay="1000"|size="16"]>
    <drv>1</drv>
    <par>8540</par>
    <idx>0</idx>
    <item value="1">enum1</item>
    <item value="2">enum2</item>
    <item value="100"> any text    </item>
</combobox>
```
← 295

FIG 14

```
40
<card id="TEST">
  <title>BICO</title>
  <content>
    <text>Parameter<br/>P(1,2080,0)</text>
    <combobox update="no">
      <drv>1</drv>
      <par>2080</par>
      <idx>0</idx>
      <item value="0">not connected</item>
      <item value="136971264">P(1,2080,0)</item>
      <item value="136971265">P(1,2090,1)</item>
    </combobox>
    <link>
      <href>..\..\MAINMENU.AXF</href>
      <label>return</label>
    </link>
```

41
| | |
|---|---|
| F8 | TAG BEGIN |
| F9 | INTEGER U8 |
| FA | INTEGER U16 |
| FB | INTEGER U32 |
| FC | INTEGER I16 |
| FD | INTEGER I32 |
| FE | FLOAT 32 |

AXF-Dictionary  42

```
<card id="ADD">
  <title>TEST</title>
  <content>
    <text>1+2=
      <macro name="ADD">
        <arg>1</arg>
        <arg>2</arg>
      </macro>
    </text>
    <link>
      <href>MAIN.AXF</href>
      <label>return</label>
    </link>
  </content>
</card>
```
~52

```
<card id="ADD">
  <title>TEST</title>
  <content>
    <text>1+2=3</text>
    <link>
      <href>MAIN.AXF</href>
      <label>return</label>
    </link>
  </content>
</card>
```
~54

METHOD FOR OPERATING AND MONITORING A CONTROL DEVICE, CORRESPONDING OPERATING/MONITORING DEVICE, CONTROL DEVICE AND MACHINE WITH SUCH A CONTROL DEVICE, AND USES OF THE METHOD TOGETHER WITH DATA STORAGE MEDIA

CROSS REFERENCE TO RELATED APPLICATIONS

This application is the US National Stage of International Application No. PCT/EP2006/063971, filed Jul. 6, 2006 and claims the benefit thereof. The International Application claims the benefits of German application No. 10 2005 034 168.3 DE filed Jul. 21, 2005, both of the applications are incorporated by reference herein in their entirety.

FIELD OF INVENTION

The present invention relates to a method for operating and monitoring a control device by means of an operating/monitoring device which has a data-oriented link to the control device. The operating/monitoring device and the control device have a processor-supported control unit for executing software programs. The present invention relates in addition to an operating/monitoring device with a graphical user interface, facilities for user inputs, a data interface to the data-oriented link to the control device, together with a processor-supported control unit for executing software programs. The invention relates in addition to a control device with a processor-supported control unit for executing software programs and with a data interface to the data-oriented link to an operating/monitoring device. Apart from this, the invention relates to a machine with such a control device. The invention relates in addition to suitable uses of the method for operating and monitoring automation and manufacturing processes, and for putting a control device into service. Finally, the invention relates to a data storage medium in each case for storing a display or interpreter program for carrying out the method in accordance with the invention.

BACKGROUND OF INVENTION

Methods of this type are known, for example, from automation and manufacturing technology. There, machines, plants or parts of a plant are monitored using an operating/monitoring device which is connected to them, or can be if needed.

A term which is also often used for an operating/monitoring device is HMI, standing for Human-Machine-Interface. The term operating/monitoring device is to be understood as a device which can visualize monitoring procedures and, if necessary, can also carry out operating procedures by means of accesses to a control device which is connected to it. An example of such an operating/monitoring device is a so-called operator panel, which provides a comparatively large display unit for a graphical user interface. On this user interface it is possible to display parameters, graphs or a schematic diagram of the machine or plant which is to be monitored. As a result of their small physical depth, operator panels can also be made as portable units. Alternatively, they can also be mounted in a side panel of a switching cabinet for a plant or machine controller. Operating/monitoring devices of this type are based, for example, on a Windows CE or Linux computer platform.

SUMMARY OF INVENTION

A machine which is to be monitored, such as for example a machine tool or a drive, usually has a control device by which the power section of the machine, of the plant or of the section of the plant is controlled, regulated and monitored and which is ruggedized for the "harsh" operation in automation and manufacturing technology. Via the control device, it is also possible to make changes to the parameters for controlling and regulating the machine, the plant or the section of the plant. The control devices themselves usually only provide limited facilities for visualizing the state of the connected machine. In most cases, light-emitting diodes (LEDs) are attached to the outside of such a control device in order to indicate, for example, the orderly operation of the machine (green LED). An LED which is showing red or is flashing usually signals an operational disorder, such as for example a breakdown of the machine. It is also well known that control devices can provide a diagnostic interface, such as for example via a serial interface based on the V24 or USB standard. Via this interface it is possible to connect, for example, a diagnostic device or even the above-mentioned operating/monitoring device.

The control devices mentioned above have a control unit, which in most cases is in the form of a so-called "embedded system". Embedded systems are embedded computer systems, which provide a service in numerous other application areas, such as for example in aircraft, automobiles or domestic appliances. By their design, which is often very hardware-oriented and comparatively simple, "embedded systems" thus combine the great flexibility of software with the performance capabilities of hardware. The development of software for these systems is thus not comparable with that, for example, for desktop or PC systems. The preferred programming languages are, for example, Assembler or C. For this reason, the operating systems used often have a scope which is restricted to the most necessary functions. Such operating systems do not, indeed, provide memory protection, but on the other hand are sufficient for real-time requirements. Common embedded operating systems are, for example, PERL, VxWorks and increasingly also special derivatives of Linux.

Embedded systems are in most cases based on the same hardware as computers, but they are generally subject to heavily restrictive external conditions. So for example, use is made of microcontrollers which, by comparison to the CPUs known from the fields of the desktop or notebook, have heavily restrictive architecture and capabilities. Other computer components such as a hard disk, keyboard, display screen, are in most cases totally absent. Depending on the requirement, a small keypad can be provided for inputs, and for outputs a small LCD display. A small flash-ROM or flash-RAM chip replaces mechanical components such as a hard disk as the electronic memory.

The software programs on an embedded system, such as for example the "downspec'd" operating system and the actual control application, are also referred to as firmware. The firmware is usually located on a ROM and consequently cannot be modified during operation. In the case of a flash-ROM, there is the possibility of a firmware update, without the chip having to be replaced. It is possible in this way to update the "software", for example via the external data interface.

Operating/monitoring devices have until now had a parameter interface, making it possible to access the embedded system directly, in order to be able to "interrogate" internal operating data of the firmware, such as for example the control logic, system parameters or internal operating states.

Control units which are available today can undertake exceptionally complex control and regulation functions in automation and manufacturing technology.

An inevitable disadvantage of this is the exceptionally complex and demanding mapping of the control logic or the structure of the control and regulation mechanisms, as appropriate, into the operating/monitoring device. Furthermore, this "mirroring" of the logic creates a strong dependency between the control devices and the operating/monitoring devices, in terms of the diversity of variants and the further technical development of such devices.

Another disadvantage is, for example, if the customer or the service personnel for a machine, plant or section of the plant must be given access to the firmware on the control unit in a control device, to enable customer-specific modifications to be carried out. In this case, if incorrect parameters are input this can result in errors, and possibly to damage to the control device or the machine to which the control unit is linked.

A large part of the development times and development costs are associated with the machine specific application, which is stored in the control unit as firmware. At the same time, an application of this type represents the "condensate", i.e. the know-how, of the development.

It is thus a great disadvantage if third parties can or may access such applications in the firmware on a control unit.

One object of the invention is thus to specify a method and a corresponding operating/monitoring device and control device, together with a machine with such a control device, by which the effort to develop and maintain an operating/monitoring device and a control device is reduced.

A further object of the invention is to minimize the effort in adapting an operating/monitoring device for a control device to which it is to be connected.

Another object of the invention is to prevent access to the firmware in a control device, while the operation and monitoring of the control device should continue to be possible.

In relation to the method, the way that the object is achieved is characterized in that an interpreter program, which can access scripts with display modules and program structures, is executed on the control unit. Here, the program structures can access operational data for the control device's firmware, in doing which the operational data is converted into display data for a prescribable display format, and vice versa. The scripts are executed, in doing which the program structures compile the associated result in the form of display modules, if applicable with the display data in the prescribed display format, and make the result available to the operating/monitoring device. A display program is executed on the operating/monitoring device, in order to display at least the display modules in the prescribable display format. Stored in the display modules are references to at least one script on the control device. These references are associated with an event, so that if the event occurs the associated script is started and executed by the interpreter program.

A particular feature of the invention is that display modules, displayed by the operating/monitoring device, in turn start scripts in the control device when appropriate events occur. As the result of their processing, these scripts for their part compile new display modules which then, in turn, can be loaded by the operating/display device. From the point of view of the operating/monitoring device scripts are, so-to-speak, started and following this, the associated result of the script processing is loaded for display.

The major advantage of the invention lies in the fact that the operating/monitoring device can no longer access the sensitive firmware of the control unit directly. Communication now takes place via an interpreter program. Access to the actual control application, and to the firmware's internal operating data, is no longer possible. Here, the program structures of the scripts are such that they permit write and read access to the control logic of the control device. An advantage of this is that it is possible to check impermissible parameter values, for example for their plausibility. By this means, impermissible states and resulting possible damage to the control unit and to the connected machine are avoided.

The interpreter program which is executed by the control unit works through scripts step-by-step. Scripts consist of a list of instructions which are executed in sequence. For this "script language", a simple program syntax is defined, which also includes conditional instructions such as branches, loops and function calls. It is also possible to extend the available set of instructions dynamically, by incorporating new program structures, for example into an instruction library. The use of scripts is known, for example from the Visual Basic or JAVA Script programming languages. In these cases, the scripts are recorded in plain text, and are correspondingly easy to read and to modify. Other known examples of scripts are so-called macros.

Associated with this is another major advantage. Because the script language, i.e. the sequential arrangement of the simple structured script instructions, permits "programming" at a high level of abstraction, without necessitating a knowledge of the actual firmware. This enables customers and OEM suppliers to create separate applications for their purposes. Simple script instructions might be, for example: "SETPARAM" or "GETPARAM", followed by a defined number of necessary arguments to be passed over or received.

The scripts described above can also undertake control of the execution of "wizards". Wizards are interactive utilities, such as for example installation programs.

It is advantageous that, because the interpreter program executes the instructions sequentially, by executing for the instruction concerned an executable code, for example in a runtime library, no compilation is necessary if changes are made to the scripts, the display modules and the program structures. The interpreter program alone accesses the complex control logic of the control device, with its device-specific special features.

Over and above this, the interpreter program can also execute in the control device other tasks, which cannot be assigned to the operating/monitoring device. For example, the interpreter program can execute for the firmware applications which are recorded in the script language.

Another major advantage is that customer-specific adaptations, such as for example a modified representation of the parameters, require absolutely no changes to the firmware of the operating/monitoring device or to the firmware of the control unit. The changes are made exclusively by the loading into the control device of new files with scripts and, if applicable, with display modules and program structures.

Using the program structures, the items of operating data for the firmware, which are normally present in a binary format, are converted into display data in a prescribable display format. One possible display format is, for example, a so-called ASCII string, which converts a binary item of operating data into a character string which is readable as plain text. To identify it for the display program, such a character string can also be enclosed between two so-called "tags". Tags are used, for example, in the markup language XML or in the data description language HTML.

The references are, as already described, associated with a triggering event. An event could be, for example, a user action on a graphical user interface of the operating/monitoring device. One example of a user action is the selection of one out of several options in a so-called combo box. The choice can be made, for example, by means of a mouse cursor, by clicking on the desired option. Depending on this, a reference is output to an associated script on the control device. A reference to the same script on the control device is also possible, for example in that an associated text or an associated code for the selected option is output as an argument with the reference.

An event might also be, for example, an internal report or alarm state for the control device. Reports of this type are for example generated as part of an interrupt or a so-called exception, or output cyclically by a monitoring program in the control device by means of an interrupt. Depending on the triggering event, an appropriate display module can also be generated and saved. This display module might, for example, visualize an error or warning text. In this way it is also possible with advantage to transmit messages to the operating/monitoring device even if there has been no user action.

The display modules incorporate especially such things as text fields, bitmaps, edit fields. Using these, it is a simple matter to create new user interfaces for the operating/monitoring device in a modular manner.

Further, the program structures incorporate, for example, mathematical and logical functions together with program branches and loops. Mathematical functions can be, for example, multiplication, division, addition. Logical functions can be, for example, OR, AND, shift operations, or also bit-related operations. The program structures can indeed be structured in such a way that functions call themselves again in a recursive manner. In this way it is possible to construct instructions which are powerful and at the same time simple.

It is possible, in accordance with a further variant of the method, to combine several display modules into display pages. By this means it is advantageously possible to display, as the result of processing a script, whole screen pages with numerous display modules, for example a top-level menu or a start window.

Preferably, the interpreter program will administer data in the form of variables and arrays, where these can be defined in the scripts. By this means it is advantageously possible to declare and make use of application-related data types.

Preferably, the scripts, the display modules and the program structures will be stored as files in a library. Here, the term library is to be interpreted broadly. In particular, it should be understood to mean an organization of the "source files" for the scripts, display modules and program structures which is advantageous in terms of data-technology, for example in directories or folders, as applicable.

The files mentioned above can also be present in a compressed file format, and when called up be decompressed again by the interpreter program. The unpacking or decompression can be effected by means of a small parser program. File compression makes possible an advantageous substantial reduction in the memory requirement for the "source files" which would otherwise be present as plain text. In addition, it is advantageous that the execution speed of the interpreter program is increased.

The display modules or the display pages compiled from display modules, as applicable, will preferably be stored in a results file. This results file can be loaded by the operating/monitoring device in a simple way, using file transfer instructions. This can be effected, for example, by specifying the file name and the associated path.

As in the case of the "source files", the display modules or the display pages compiled from display modules, as applicable, can also be stored in a compressed file format in the results file. For this purpose, the interpreter program will execute a suitable compression program. After the compressed file is loaded, it is then unpacked again by the display program. Particularly suitable for this purpose is an ACX or ACF file format, which compresses text especially efficiently, with little software effort.

In a further preferred embodiment, the display program checks cyclically for the presence of updated display modules or updated display pages compiled from display modules, as applicable. For example, if a results file is available with a more recent date and time, compared to the last results file which was loaded, then the results file will be loaded and the display objects it contains displayed.

In a preferred embodiment of the method, the scripts, the display modules and the program structures are structured in the notation of the markup language XML (Extensible Markup Language). XML is a standardized markup language, the concepts and rules of which can be used to define individualized markup languages, programming languages and script languages. A script language developed on the basis of these concepts and rules always consists of elements, marked by so-called tags, of their nesting rules, and of attributes with permitted value assignments.

The great advantage of a script language based on XML is the simplicity of extending their elements and the availability of a host of development tools such as XML Tools, editors, and checking tools such as DTD (document type definition) for syntax checking.

Alternatively, for executing the scripts use can be made of the script language Tcl (Tool command language) with display modules based on Tk (Tool kit). Appropriate libraries and tools are also available, so that a user will be in a position within a very short time to create scripts.

The interpreter program will preferably be executed by the control unit in a background process. This has the associated advantage that the control device gives priority to the execution of control and regulation tasks, so that these tasks are not detrimentally affected by script calls.

In particular, the control unit executes software programs for a real time operating system, such as for example PERL, VxWorks or RTLinux. This makes it possible to execute several monitoring, control and regulation tasks in parallel. A higher-level time-slice management system ensures that the tasks which are to be executed are given adequate computational time within a prescribable time interval, according to their priorities.

In a further advantageous method variant, the data transmission between the operating/monitoring device and the control device is effected wirelessly, for example by means of the standardized transmission procedures WLAN, Bluetooth on the basis of radio technology, or by means of IRDA on the basis of infrared radiation. By comparison with the common standardized wired transmission procedures by such means, for example, as LAN, Ethernet or USB, the establishment of a connection is possible immediately, as soon as the operating/monitoring device comes within the detection range of a control device. In the case both of wire-free and also of wire-conducted data transmission, all the display modules are loaded and displayed exclusively by the control device concerned, so a further advantage is that operation and monitoring of several reachable control devices is possible. After one of the reachable control devices has been selected it is possible, for example, to press a refresh or update button on the operating/monitoring device, so that the results file, with the display modules, belonging to the control device which is currently to be monitored can be read out and displayed.

The method in accordance with the invention can also be used for putting a control device into service. This means that, using a single operating/monitoring device, it is advantageously possible to put into service, for example, an entire plant with numerous control devices.

The method in accordance with the invention can be used with particular advantage to operate and monitor automation and manufacturing processes, because in this industrial environment use is made of a large number of very different control devices, with different control and regulation functions.

Further, the display program for carrying out the method in accordance with the invention on an operating/monitoring device, can be stored on a data storage medium in (exclusively) machine-readable form.

The interpreter program and/or the library of scripts, display modules and program structures, for carrying out the method in accordance with the invention on a control device, can also be stored on a data storage medium in machine-readable form.

The data storage medium can be, for example, a diskette, a compact disk (CD) or a digital versatile disk (DVD). Alternatively, the data storage medium can also be a compact electronic memory card, in particular an MM card, SD card or CF card.

Local reading-out from the data storage medium can advantageously be effected by means of a suitable reader in the operating/monitoring device or in the control device. In particular, due to their exceptionally compact construction electronic memory cards and the corresponding readers are advantageously suitable for incorporation into an operating/monitoring device or control device, as applicable.

The object is further achieved with an operating/monitoring device corresponding to the method. For this purpose, the operating/monitoring device has a graphical user interface, facilities for user inputs, a data interface for data-oriented linkage of the operating/monitoring device to a control device, together with a processor-supported control unit for executing software programs.

The control unit is used to execute a display program for carrying out the method in accordance with the invention. The display program serves, in particular and at least, to load and display modules in a prescribable display format on the graphical user interface. The display program also serves to output a reference to at least one script on the control device. Here, the reference is stored in the display modules and can be selected by a user action on the graphical user interface.

In a particular embodiment, an operating/monitoring device in accordance with the invention has a touch-screen, which is at the same time both the display unit for the graphical user interface, for example an LCD display, and the input facility. Display modules, which are displayed on the graphical user interface and which offer a user several options from which to select, permit the selection to be made with advantageous simplicity by pressing with a finger. Furthermore, there is an advantageous reduction in the number of keys.

In a preferred embodiment, the operating/monitoring device is made in the form of a portable mobile unit. This device can with advantage be taken along by, for example, a service technician or a commissioning engineer for the application concerned.

It is particularly advantageous if the operating/monitoring device is designed as an operator panel for use in automation and manufacturing technology. Devices of this type are particularly designed for the harsh industrial environment.

The object is further achieved with a control device corresponding to the method. Such a control device has a processor-supported control unit for executing software programs and a data interface for a data-oriented link to an operating/monitoring device.

The control unit is used to execute an interpreter program for carrying out the method in accordance with the invention. In particular, the interpreter program is used to start and work through a script using an associated reference to the script in the control device, received from the data interface. The interpreter program is also used to compile the associated result of the processing, using the program structures of the script which has been started, in the form of display modules. Finally, the interpreter program serves to store the display modules on the control device.

It is preferable if the control unit of such a control device has a microcontroller. Unlike a CPU, a microcontroller incorporates numerous digital inputs and outputs together, if appropriate, with several analog inputs and outputs. These enable an advantageously large number of measurement signals, switching signals, rotational speed signals etc. to be captured. At the same time numerous actuators, such as motors, positioners, valves, can be driven via downstream power amplifiers. The integration of the input/output channels on the microcontroller makes possible an exceptionally compact construction.

Some microcontrollers incorporate an integral RAM memory and a ROM memory. In this way, it is also possible to give mechanical protection against unauthorized accesses to firmware which is held in the ROM memory.

A control unit of this type can also be regarded as an embedded system in the control device. Additional matching circuits and driver modules which are necessary can be arranged on a circuit board, with the microcontroller, in exceptionally compact form and if appropriate can be encapsulated against environmental influences.

It is especially advantageous to construct a control device as a programmable controller. Because of the diverse control and regulation tasks in the industrial environment there is, precisely there, a desire for devices which can be operated and monitored in a simple manner.

Finally, a machine or a section of a plant which has a control device in accordance with the invention for controlling the machine or section of the plant, is advantageously faster and more efficient to operate and monitor.

BRIEF DESCRIPTION OF THE DRAWINGS

The invention will be explained in more detail by reference to the following figures, in which FIG. 10-13 show examples of display modules which are displayed graphically together with the relevant associated sequence of instructions in XML, FIG. 14 shows the principle of how the compression of an exemplary XML script into a corresponding AXF file works in accordance with the invention, FIG. 17 shows the associated instruction lines of the exemplary script or display module, as appropriate, as shown in FIG. 16 in XML.

DETAILED DESCRIPTION OF INVENTION

Figure 1:
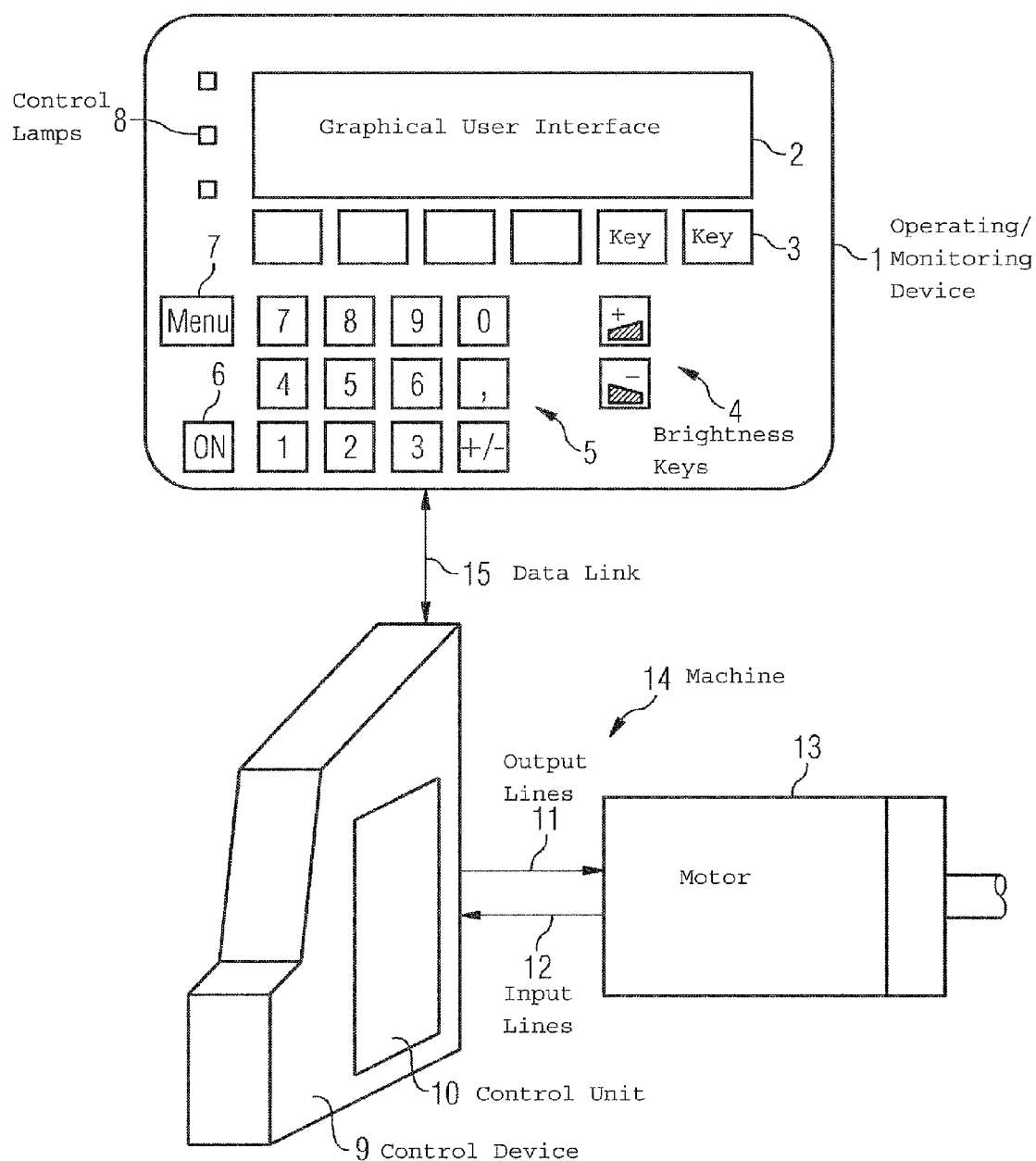
FIG. 1 shows an example of an operating/monitoring device with a data-oriented link to a control device.

FIG. 1 shows an example of an operating/monitoring device 1 which has a data-oriented link to a control device 9. The operating/monitoring device 1 has, as applicable, a display unit or graphical user interface 2 for displaying the display modules loaded by the control device 9. In addition, the operating/monitoring device 1 incorporates, by way of example, a row of keys 3 which, as so-called softkeys, execute instructions or functions which are shown above them symbolically or descriptively on the graphical user interface 2. The keys 4 permit the brightness of the display to be set. A numeric block 5 permits numeric values to be input, for example a change to process parameters. Using the switch 6, the operating/monitoring device 1 can be switched on and off. An immediate return to a top-level menu can be made by means of the key marked 'Menu'. The control lamps are indicated by the reference mark 8.

FIG. 1 shows in addition an example of a control device 9 which is linked to the motor 13, as shown in the example in the figure. As shown in the example in the figure, the motor 13 and the control device 9 form a machine 14, such as for example a machine tool. The control device 9 can also be mounted directly on a flange on the motor 13. The control device 9 has a control unit 10, preferably in the form of an embedded system. The control unit 10 communicates with the operating/monitoring device 1 via a wireless or wired data link 15. The exemplary motor 13 is connected to the control device 9 via output lines 11 and input lines 12, for such purposes as the capture of the rotational speed.

Figure 2:
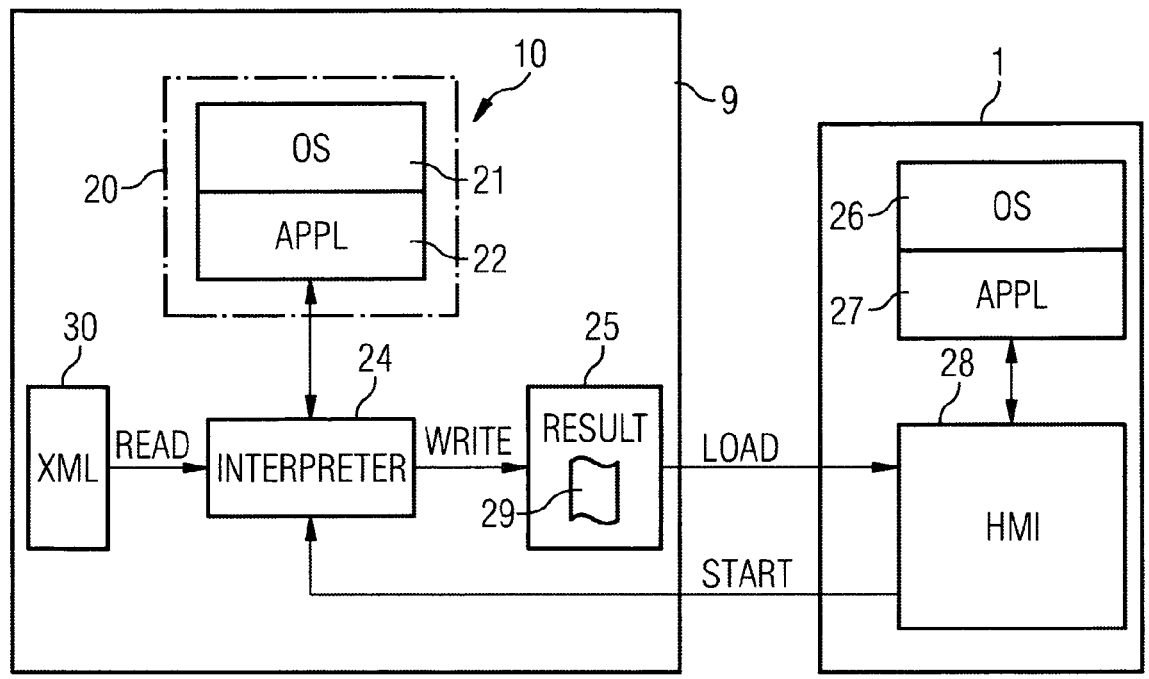
FIG. 2 shows a diagram of the functional blocks in the example of an operating/monitoring device and control device, and their interactions in accordance with the inventive method.

FIG. 2 shows a diagram of the functional blocks for the exemplary operating/monitoring device 1 and the control device 9, together with their interoperation in accordance with the inventive method. The operating/monitoring device 1 has an operating system 26 for performing the essential input and output functions of the operating/monitoring device 9. The reference mark 27 identifies an example of an application APPL, which can be executed separately or even in parallel with the display program 28—identified by "HMI" in the example in the figure. The application 27 could be, for example, a text editor or a calculator program.

FIG. 2 shows in addition the exemplary control device 9 with the control unit 10, identified by a dash-dotted frame. The control unit 10 incorporates an operating system 21 together with an example of an application, 22. This application 22 could be, for example, a control and regulation program for the exemplary motor 13 connected to the control device 9, as shown in FIG. 1. In this example, the operating system 21 and the application 22 form the firmware of the control unit 10.

In accordance with the invention, an interpreter program 24 is provided which can read out scripts, display modules and program structures in the XML notation, from a library 30. This is indicated by an arrow with the label READ. Display modules 29 which are generated as part of the processing are stored away as a results file 25. This is symbolized by another arrow with the label WRITE. Another arrow with the label START indicates the path taken by a request from the display program 28 to the interpreter program 24. Along this path is transmitted an identifier for the desired script, which is then immediately processed by the interpreter program. After this, the result of this processing can be loaded by the display program 28 as the results file 25. This is symbolized by the arrow with the label LOAD.

Figure 3:
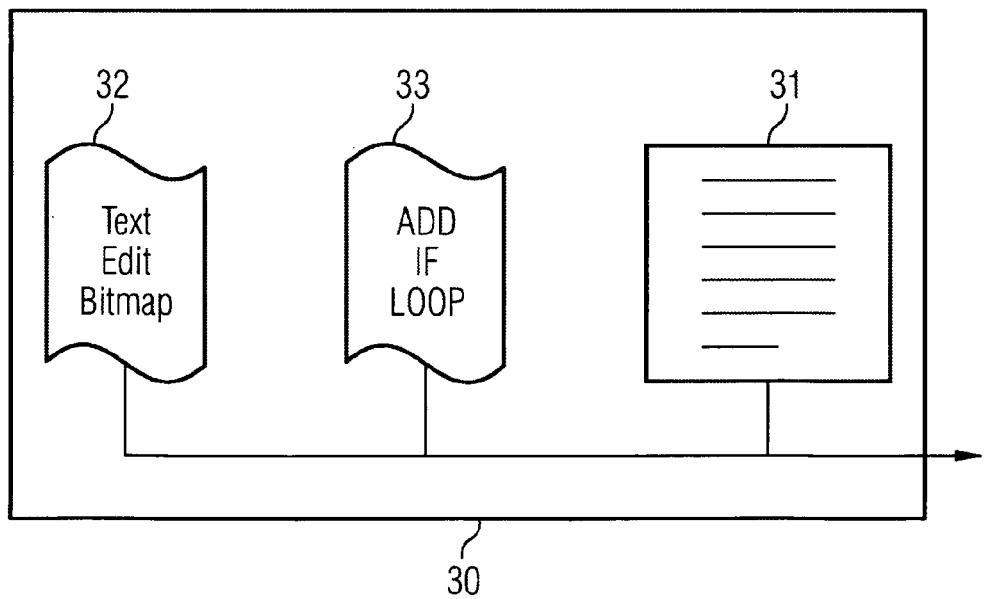
FIG. 3 shows an example of the structure of a library with display modules, program structures and scripts in accordance with the invention, FIG. 4, 5 show exemplary program structures in the notation of the XML markup language, FIG. 6, 7 show exemplary scripts in XML, FIG. 8, 9 show an exemplary data structure for a program structure in XML, which interacts with the internal control logic of a control device.

FIG. 3 shows an example of the structure of a library 30 with scripts 31, display modules 32 and program constructs 33. Here, the scripts 31 can in turn be made up of display modules 32 and program structures 33. As part of the processing of the scripts, the interpreter program incorporates the display modules 32 and program constructs 33 stored in the library 30 as modules in a new display module. As described in the introduction, it is advantageous to organize these files in directories or folders, as applicable.

FIG. 4, 5 show examples of program structures 331, 332 in the notation of the XML markup language.

FIG. 4 shows the syntactical principle of a program structure 331 which has the name "ADD", which adds together a series of summands. These summands are passed across in the form of arguments when this program structure 331 is called up. Here, <arg> identifies the start of an argument which is to be passed across. </arg> is the corresponding end. The numeric value which is to be passed across is then inserted between these two parenthetical expressions. After the processing, the result, i.e. the sum of the summands, is returned to the calling function as the result.

FIG. 5 shows a program structure 332, in this case a well known IF-ELSE instruction, which is familiar from other programming languages such as for example PASCAL. The associated example of a data structure specifies that the operands which are to be compared should be passed across in the first and third lines as arguments. In the second line, the nature of the comparison is to be specified by means of an operator, such as for example, "greater than", "equal to", "lower than". In the two lines which follow, labeled as <do> arguments, there follows the sequence of instructions for the situation in which the result of the comparison is positive. Otherwise, the alternative processing which follows the keyword label "ELSE" is carried out.

FIG. 6, 7 show examples of scripts 311, 312 in XML.

The script shown in FIG. 6 with the title LOAD_PAGE is specified and started by the display program on the operating/monitoring device 1 as a reaction to a user action. The exemplary data structure determines an absolute path specification from a relative path specification, so that the desired file can be addressed. The instruction PARSE_PAGE is used to load the file, which can in turn have scripts 31, display modules 32 or program structures 33, and these are then processed.

FIG. 7 shows a program structure 312 with the title "LOAD_PARAMETER". In accordance with the XML notation, the innermost program structure is processed first, i.e. the instruction "GETPARAM". The parameter value which is determined is then converted to a string, i.e. into a character string, and is then stored away in the results file as a display module.

FIG. 8, 9 show by way of example the data structure 333 for a program structure 334 in XML, which interacts with the internal control logic of a control device.

FIG. 8 shows the data structures of a GETPARAM and a SETPARAM instruction. In each of the data structures is specified the number of arguments which are to be passed across or read.

FIG. 9 shows a program structure based on them, which—starting in turn from the innermost program structure—reads out the value of the parameter 98 and writes this value into the parameter 99. A simple copy instruction is concerned in this case.

FIG. 10-13 show by way of example display modules 291-292 which are displayed graphically, together with the relevant associated sequence of instructions 294-295 in XML. FIG. 10 shows a text field with the title "Main menu". The size of this example of a text field is set by the parameter size="16", as shown in FIG. 11. If this text field is selected, for example with a mouse cursor, then the interpreter program 24 is requested by the display program 28 to load the exemplary file "SINAMICS_G\MAIN.AXF", whose display modules can display a main menu screen page. FIG. 12 shows a so-called combo box with the present title "enuml". Selecting the arrow 293 which is displayed then enables a selection to be made from among several fields. FIG. 13 shows an example of the possible choices, specified in the instruction lines with the keyword "item".

Figure 14:
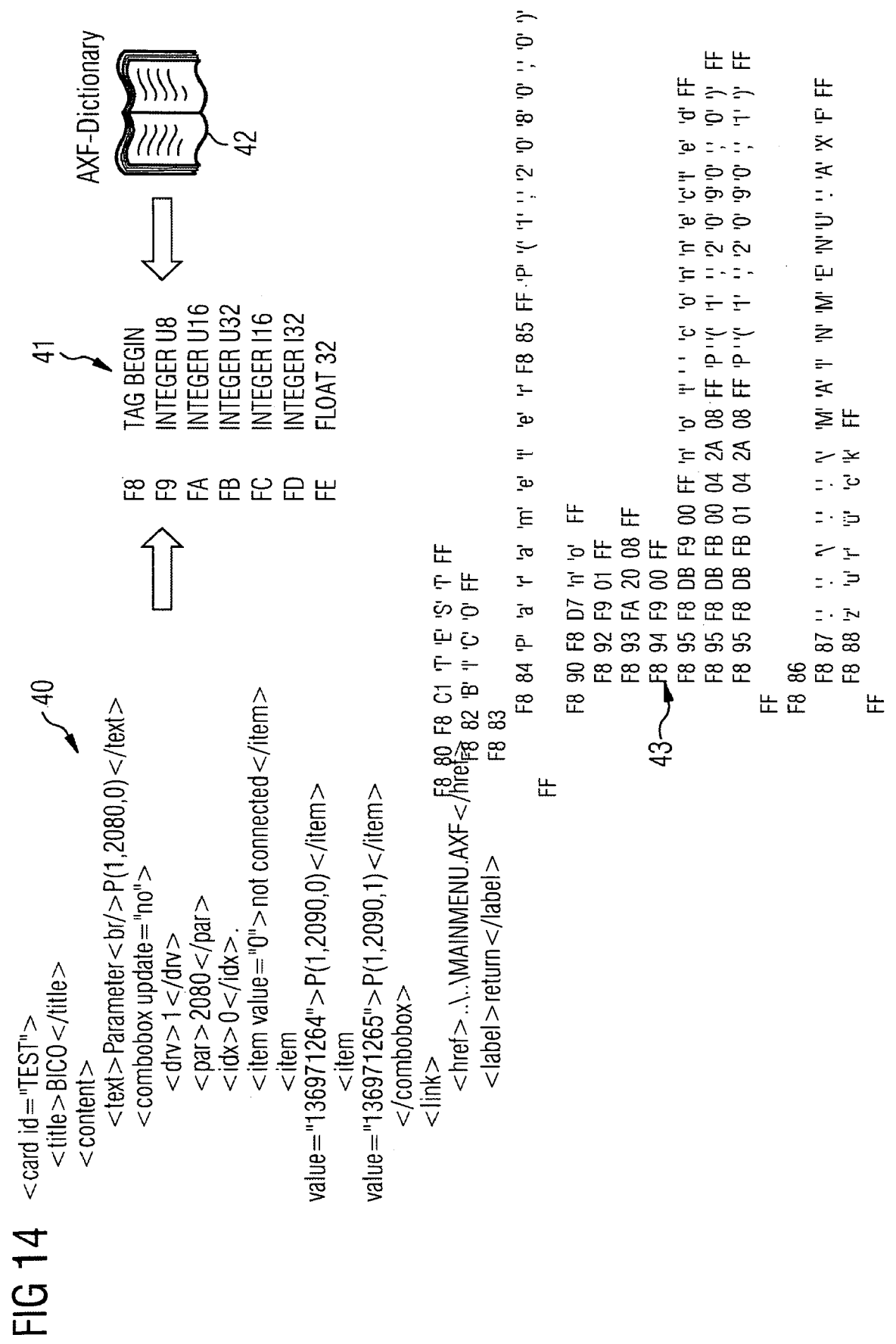

FIG. 14 shows the functional principle of the compression of an exemplary XML script 40 into a corresponding AXF file 43 according to the invention. The script 40 is given in plain text. In terms of data technology, this script is nothing other than a character string with a particular length. Using an AXF dictionary 42, instructions such "text", "combobox update" or "item" are represented by an appropriate hexadecimal mnemonic. Likewise, numeric types such as "INTEGER" or "FLOAT" can be replaced in accordance with a translation table 41 by other mnemonics. The result, i.e. the AXF file 43, is shown in hexadecimal representation. By comparison with the original storage requirement for the script 40 in plain text, the storage requirement has reduced substantially.

Figure 15:
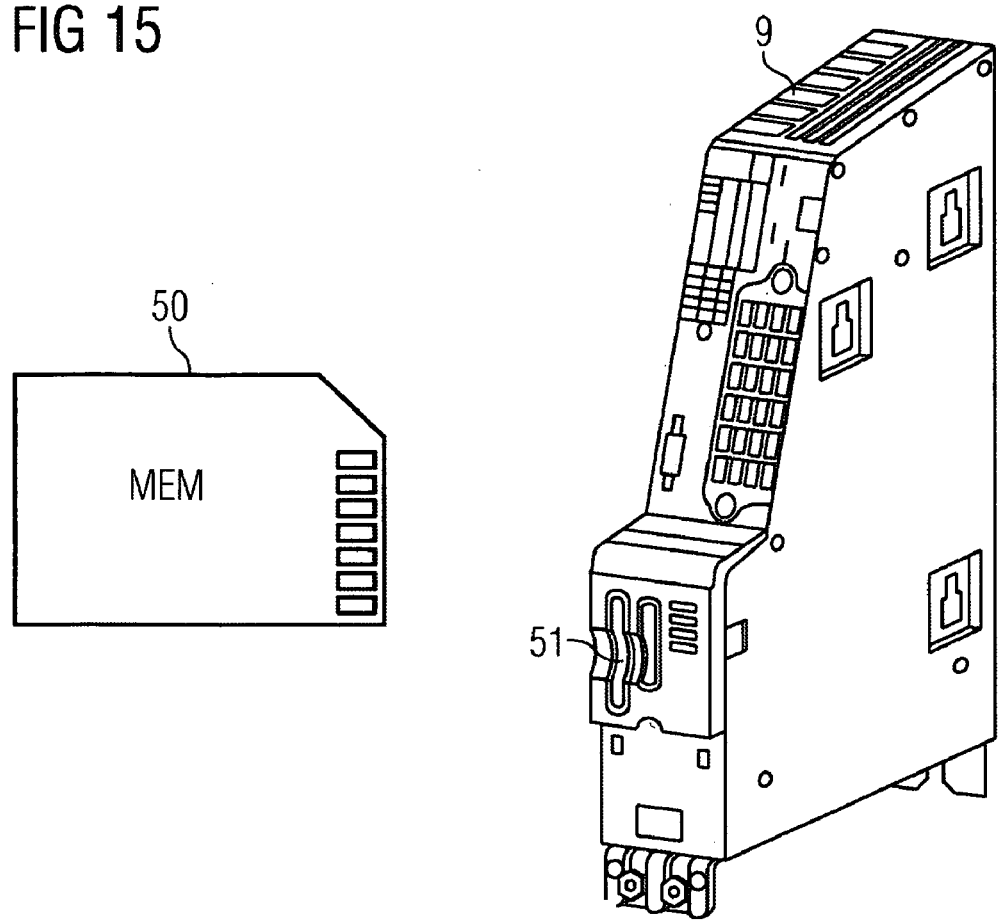
FIG. 15 shows an example of a control device with a reader for reading out an electronic memory card as the data storage medium for an interpreter program in accordance with the invention.

FIG. 15 shown an example of a control device 9 with a reader 51 for reading out an electronic memory card 50 as the data storage medium for an interpreter program 24 in accordance with the invention. The electronic memory card 50 can in this case be inserted into a slot 51 provided for the purpose on the outside of the control device 9.

Figure 16:
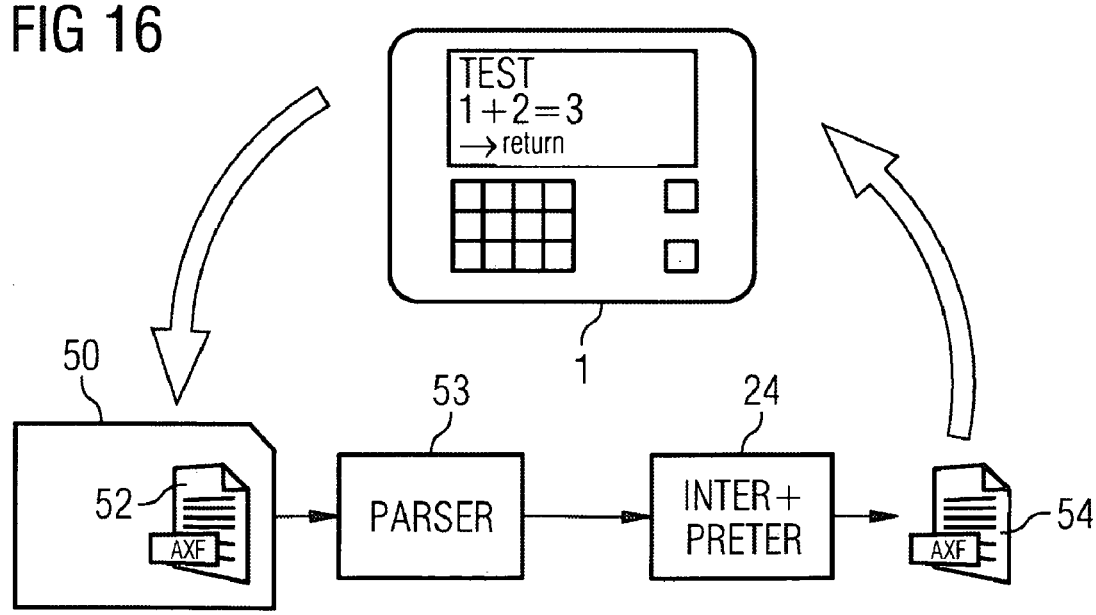
FIG. 16 shows an exemplary sequence of activities for starting, working through a script, and a display module generated by this in accordance with the inventive method, exemplified by a test script.

FIG. 16 shows an example of the sequence of steps for starting, processing a script 52 and a display module 54 generated by this in accordance with the inventive method, using a test script as an example.

FIG. 17 shows the associated instruction lines in XML of the examples of a script and display module respectively, shown in FIG. 16.

As shown in FIG. 16, the test script 52 is held in compressed form on an electronic memory card 50. Now consider the test script 52 as a new "application" which a customer or a programmer has generated for the control device 9. After the electronic memory card 50 is inserted, the compressed XML file which it contains is unpacked by means of a parser program 53 on the control device 9, and is then processed by the interpreter program 24.

FIG. 17 shows the unpacked instruction lines as they are available in the interpreter program 24 after unpacking. This is the test script for an addition program "ADD", which is intended to add together the two numbers 1 and 2. This addition program is now processed by the interpreter program 24, and an appropriate display module generated in script form. This is shown on the right-hand side of FIG. 17. The display module now also contains the result of the mathematical operation, as the text details 1+2=3. This display module is then compressed and stored away on the control device 9, for example on a RAM disk, as the results file 54. A load instruction in the display program 28 causes this results file 54 to be loaded and following this the display module is displayed on the graphical user interface of the operating/monitoring device 1. This is shown in the example in FIG. 16.

The invention claimed is:

1. A method for operating and monitoring a control device with an operating and monitoring device, wherein the control device operates via firmware and has a data-oriented link to the operating and monitoring device, wherein the control device and the operating and monitoring device have a processor-supported control unit for executing software programs, comprising:

restricting direct access to the firmware of the control device by providing access to the firmware by the operating and monitoring device through an interpreter program executed on the control device, wherein scripts with display modules and program structures are accessable by the interpreter program;

upon an occurrence of an event, converting internal operating data by the interpreter of the control device into display data in a prescribable display format, and converting display data into internal operating data, wherein the internal operating data for the firmware on the control device are accessable by the program structures;

processing scripts associated with the event, wherein the program structures compile and store an associated result from the processing in the processor-supported control unit in form of display modules with display data in the prescribed display format, and make the result available to the operating and monitoring device;

executing a display program on the operating and monitoring device to display the display modules in the prescribable display format loaded from the processor-supported control unit into the operating and monitoring device; and storing references to at least one script on the control device in the display modules to allow for selection by a user action as one event when the display modules are loaded onto the operating and control device, wherein the references are associated with the event, wherein the associated script is started and processed by the interpreter program when the event occurs, wherein the display modules incorporate text fields, bit maps, and edit fields, wherein the program structures incorporate mathematical and logical functions together with program branches and loops, wherein several display modules are combined into display pages, and wherein the interpreter program is executed by the control unit in a background process and checks for impermissible parameter values to avoid impermissible states, thereby preventing damage to the control device.

2. The method as claimed in claim 1, wherein the event is selected from the group consisting of:

a user action, selectable on a graphical user interface to the operating and monitoring device, an internal report of the control device, and an alarm state of the control device.

3. The method as claimed in claim 2, wherein the internal report or alarm state is output cyclically by the control device.

4. The method as claimed in claim 1, wherein the interpreter program manages data in the form of variables and arrays which are defined in the scripts, and wherein the scripts, the display modules and the program structures are present in a library as files.

5. The method as claimed in claim 1, wherein the display modules or the display pages made by combining display modules, as applicable, are stored in a result file.

6. The method as claimed in claim 1, wherein the display program checks cyclically for a presence of updated display modules or updated display pages from combinations of display modules, as applicable, and if they are present loads and displays them.

7. The method as claimed in claim 1, wherein the scripts, the display modules and program structures are structured in a notation of an extensible markup language.

8. The method as claimed in claim 1, wherein the script language Tool command language (Tcl) is used for processing the scripts, wherein the display modules are based on Tool kit (Tk).

9. The method as claimed in claim 1, wherein the control unit executes software programs of a real time operating system and wherein the operating and monitoring device and the control device communicate via a wireless data transmission link.

10. A system for operating and monitoring a control device comprising:
an operating and monitoring device, comprising:
a graphical user interface;
facilities for user inputs;
a data interface for a data-oriented link between the operating and monitoring device and a control device;
the control device comprising a processor-supported control unit for executing software programs, including an interpreter program executed on the control device that restricts direct access to the firmware of the control device by providing access to the firmware through the interpreter program,
wherein scripts with display modules and program structures are accessable and executed by the interpreter program upon an occurrence of an event,
wherein the interpreter program of the control device is adapted to convert internal operating data into display data in a prescribable display format, and display data are converted into internal operating data,
wherein the internal operating data for the firmware on the control device are accessable by the program structures,
wherein program structures compile and store the associated result in the form of display modules with display data in the prescribable display format, and make the result available to the operating and monitoring device,
wherein the operating and monitoring device comprises a display program to display the display modules in the prescribable display format, and references are stored to at least one script on the control device in the display modules to allow for selection by a user action as one event when the display modules are loaded onto the operating and control device,
wherein the references are associated with an event, wherein the associated script is started and processed by the interpreter program when the event occurs; wherein the display program
loads and displays the display modules on the graphical user interface in the prescribable display format; and
outputs a reference to at least one script on the control device, with the reference being held in the display modules and being able to be selected by a user action on the graphical user interface, the user action comprising the event,
wherein the display modules incorporate text fields, bit maps, and edit fields,
wherein the program structures incorporate mathematical and logical functions together with program branches and loops,
wherein several display modules are combined into display pages, and
wherein the interpreter program is executed by the control unit in a background process and checks for impermissible parameter values to avoid impermissible states, thereby preventing damage to the control device.

11. The operating and monitoring device as claimed in claim 10, wherein the graphical user interface is a touch screen.

12. The operating and monitoring device as claimed in claim 10, wherein the operating and monitoring device is a portable mobile unit.

13. The operating and monitoring device as claimed in claims 10, wherein the operating and monitoring device is an operator panel for use in automation and manufacturing technology.

14. The operating and monitoring device as claimed in claim 10, wherein the operating and monitoring device has a reader for a data storage medium, wherein the data storage medium is selected from the group consisting of a diskette drive, a CD drive, a DVD drive, a reader for reading out electronic memory cards, and a combination thereof.

15. The operating and monitoring device as claimed in claim 10, wherein a wireless data interface for connecting the operating and monitoring device to the control device is based on a connection selected from the group consisting of a wireless local area network (WLAN) connection, an Infrared Data Association (IRDA) connection, and a Bluetooth connection.

* * * * *